United States Patent
Rolle

(10) Patent No.: US 8,251,604 B2
(45) Date of Patent: Aug. 28, 2012

(54) DEVICE FOR SECURING A SPOKE TO THE RIM OF A SPOKED WHEEL

(75) Inventor: Adriano Rolle, Rivara (Torino) (IT)

(73) Assignee: Ruotemilano S.r.l., Milan (IT)

( * ) Notice: Subject to any disclaimer, the term of this patent is extended or adjusted under 35 U.S.C. 154(b) by 291 days.

(21) Appl. No.: 12/373,142

(22) PCT Filed: May 9, 2007

(86) PCT No.: PCT/EP2007/004080
§ 371 (c)(1),
(2), (4) Date: Jan. 9, 2009

(87) PCT Pub. No.: WO2008/009321
PCT Pub. Date: Jan. 24, 2008

(65) Prior Publication Data
US 2009/0311039 A1    Dec. 17, 2009

(30) Foreign Application Priority Data
Jul. 19, 2006  (IT) ................... MI06A1401

(51) Int. Cl.
*B60B 1/02* (2006.01)
(52) U.S. Cl. ............... 403/77; 301/58; 301/67
(58) Field of Classification Search ......... 403/76, 403/77; 301/55, 58, 67, 68, 69, 70, 71, 72, 301/104
See application file for complete search history.

(56) References Cited

U.S. PATENT DOCUMENTS

| 309,566 | A | * | 12/1884 | Schad et al. ............... 301/58 |
| 1,444,508 | A | * | 2/1923 | Kemp .................. 301/67 |
| 1,507,615 | A | * | 9/1924 | Mosier .................. 301/69 |
| 5,806,935 | A | * | 9/1998 | Shermeister ............... 301/58 |
| 2006/0119170 | A1 | | 6/2006 | Hjertberg |

FOREIGN PATENT DOCUMENTS

| DE | 202004017326 | 1/2005 |
| EP | 1167078 | 1/2002 |
| EP | 1209006 | 5/2002 |
| WO | 2005058613 | 6/2005 |

OTHER PUBLICATIONS
International Search Report dated Oct. 26, 2007, in PCT application.

* cited by examiner

*Primary Examiner* — Michael P Ferguson
(74) *Attorney, Agent, or Firm* — Young & Thompson

(57) ABSTRACT

A device (1) for securing to the rim (11) of a spoked wheel a stud (2) connected to a spoke, includes:—a screw (3) adapted to be inserted in a through hole, made in the rim (11), which has a seat (4) adapted to receive the head (5) of the screw (3);—a body (6), adapted to be secured to the rim (11) the screw (3), which has at last a threaded hole (7) adapted to receive the threaded shank of the screw (3) and a seat (8) adapted to receive a rounded head (9) of the stud (2), which is connected in an articulated manner to the body (6);—a sealing ring (10) inserted between the rim (11) and the body (6). The head (5) of the screw (3) and the corresponding seat (4) present in the rim (11) preferably have a countersunk shape.

17 Claims, 2 Drawing Sheets

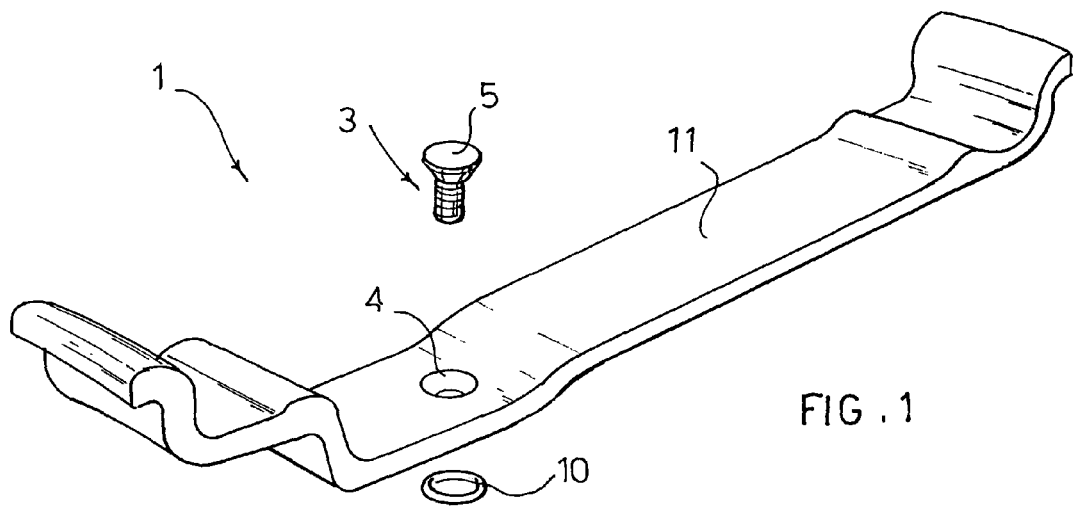
FIG. 1
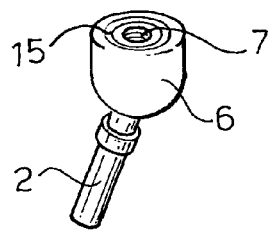
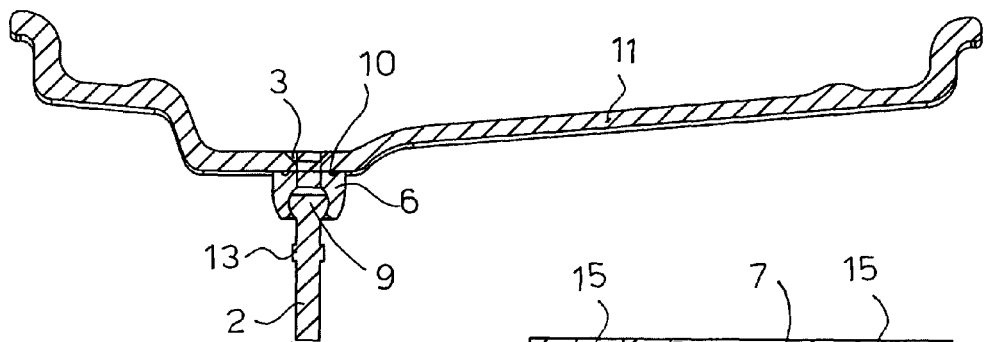
FIG. 2
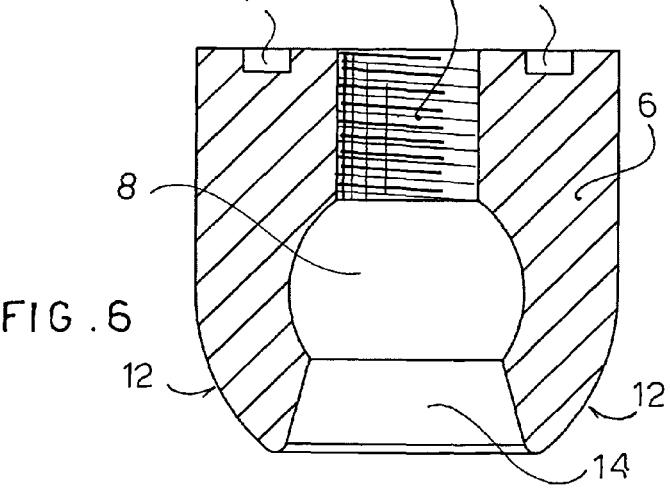
FIG. 6

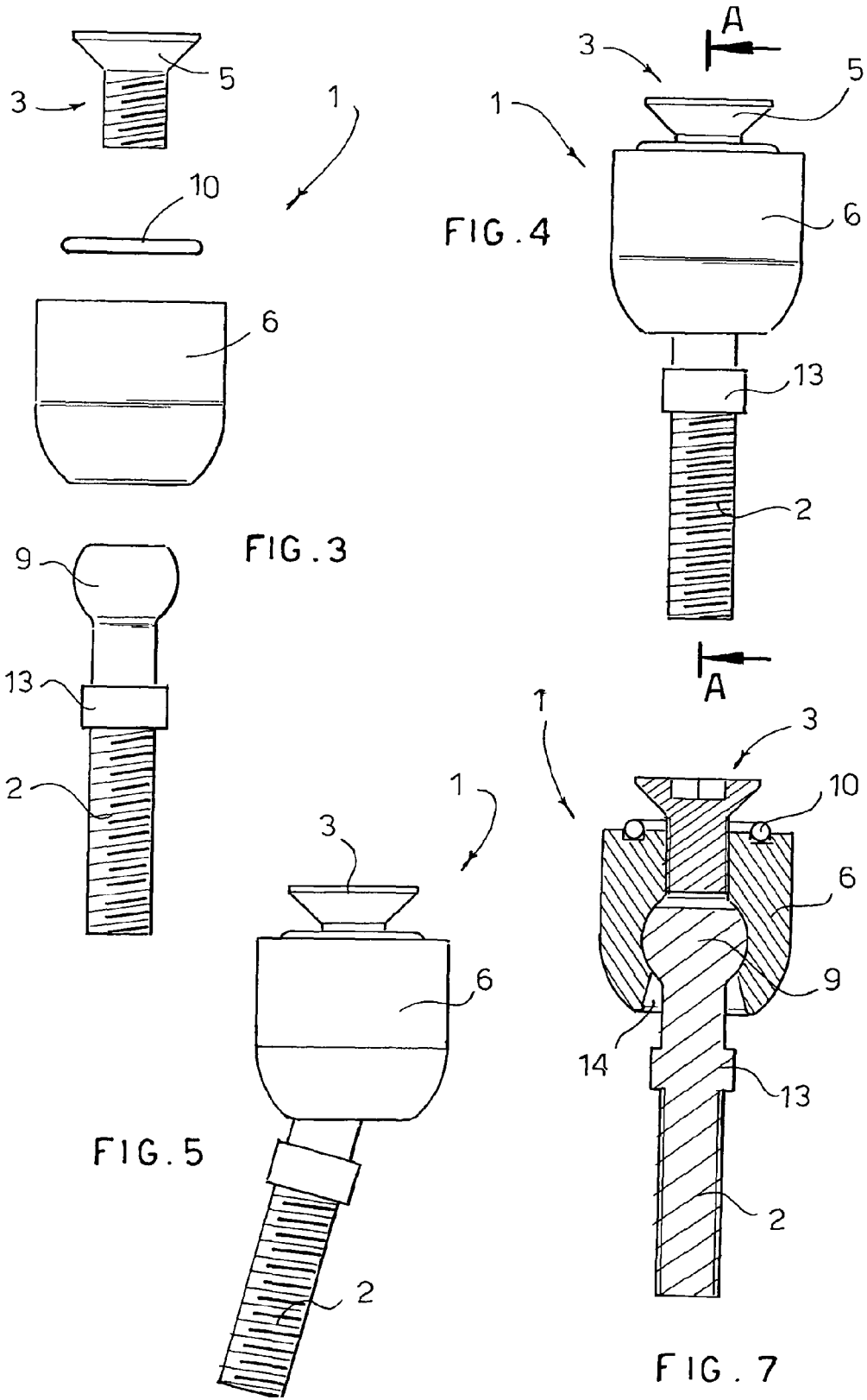

DEVICE FOR SECURING A SPOKE TO THE RIM OF A SPOKED WHEEL

The present invention relates to a device for securing a spoke to the rim of a spoked wheel for a motorcar or motor vehicle.

BACKGROUND OF THE INVENTION

Spoked wheels, used to equip a motor car or a motor vehicle, are known to the art, each spoke thereof consisting of;
a cylindrical element (know as the "shaft"), which has at one end (generally slightly bent) a hemispherical area and at the other end a threaded area;
a securing body (known as a "nipple"), circular or polygonal in section, which has at one end a threaded opening wherein the threaded area of the shaft is screwed and at the other end a hemispherical area which engages in a per se known manner with the wheel rim and which protrudes inside the rim;

The spoke is mounted by inserting the shaft in a hole made in a perforated disc (to be mounted on the wheel hub) until its hemispherical end adheres to said disc, by engaging the threaded end of the shaft in the threaded opening of the nipple, by engaging the hemispherical end of the nipple with the rim of the wheel and by screwing the nipple onto the shaft to give the spoke the desired tension.

The polygonal section of the nipple makes it easier to screw it onto the shaft in order to tension the spoke.

Traditional securing systems present drawbacks and/or limitations, amongst which can be cited, by way of example, the fact that:
they do not allow the use of tubeless or run-flat tyres because the nipples protrude inside the rim and the means engaging the nipples with the rim are not airtight;
to accommodate the nipples without having to increase the thickness of the rim it is necessary to make bossed holes in the rim;
in particular cases, it is not possible to make bossed holes in the rim and it is therefore necessary to increase the thickness of said rim, thus increasing the weight and the cost thereof,
the securing means of each nipple must be made so as to give the spoke carried by the nipple the required inclination.

SUMMARY OF THE INVENTION

The object of the present invention is a securing device able to overcome the limits presented by the securing devices of the prior art; this object is achieved by means of a securing device, as further described below.

BRIEF DESCRIPTION OF THE INVENTION

The invention will now be described with reference to a purely exemplifying (and therefore to non limiting) embodiment thereof, illustrated in the appended figures, wherein:

FIG. 1 is a diagrammatic perspective view of a portion of the rim and of the securing device, partially exploded;

FIG. 2 is a diagrammatic sectional view of a portion of the rim and of the securing device assembled and fixed to the rim;

FIG. 3 is a diagrammatic front view of the securing device exploded;

FIG. 4 is a diagrammatic front view of the securing device assembled;

FIG. 5 is a diagrammatic view of the securing device of FIG. 4, wherein the stud is rotated with respect to the body of the securing device;

FIG. 6 is a diagrammatic sectional view of the body of the securing device;

FIG. 7 shows diagrammatically the securing device of FIG. 4 sectioned along the plane A-A of FIG. 4.

In the appended figures corresponding elements will be identified by the same reference numerals.

DETAILED DESCRIPTION OF THE PREFERRED EMBODIMENTS

A securing device according to the invention, adapted to secure to the rim a spoke of a spoked wheel, comprises at least:
a screw adapted to be inserted in a through hole made in the rim, which has a seat adapted to receive the head of the screw;
a body, adapted to be secured to the rim by means of the screw, which has a threaded hole adapted to receive the shank of the screw and a seat adapted to receive the rounded head of a stud—fixed to the spoke—connected in an articulated manner to the body of the securing device;
a sealing ring inserted between the rim and the body of the securing device.

The head of the screw and the corresponding seat present in the rim advantageously have a countersunk shape.

The securing device of the present invention can also be used advantageously to secure a spoke to the rim of a spoked wheel for a motor cycle.

In the appended figures the numeral 1 indicates the device according to the invention, the numeral 2 indicates one of the studs, the numeral 3 indicates a securing screw, the numeral 4 indicates a seat of a through hole—made on the rim 11—which receives the countersunk head 5 of the screw 3, the numeral 5 indicates the countersunk head of the screw 3, the numeral 6 indicates a body to be secured to the rim 11 by means of the screw 3, the numeral 7 indicates a threaded hole present in the body 6 and adapted to receive the threaded shank of the screw 3, the numeral 8 indicates a seat present in the body 6 and adapted to receive the rounded head 9 of the stud 2, the numeral 9 indicates the rounded head of the stud 2, the numeral 10 indicates a sealing ring, the numeral 11 indicates the rim, the numeral 12 indicates the edges of the body 6 to be bent to block the rounded head 9 of the stud 2 in the seat 8, the numeral 13 indicates a shaped collar (if any) present on the stud 2, the numeral 14 indicates a countersunk exit opening of the seat 8 and the numeral 15 indicates a seat formed in the body 6 to receive the sealing ring 10.

FIG. 1 shows diagrammatically, in a perspective view, a portion of the rim 11 and of the securing device 1 partially exploded.

Visible in FIG. 1 are the stud 2, the screw 3 inserted in a through hole (made in the rim 11 and not identified by a reference numeral in the appended figures) which has a seat 4 adapted to receive the head 5 of the screw 3, the body 6 (better described with reference to FIG. 6) able to be secured to the rim 11 by means of the screw 3 and the sealing ring, preferably an O-ring, placed between the rim 11 and the body 6.

FIG. 2 shows diagrammatically, in section, a portion of the rim 11 and the securing device 1 assembled and secured to the rim 1.

Visible in FIG. 2 are the rim 11, the stud 2 inserted in the body 6 (FIG. 6) and having a rounded head 9 and a collar 13 (better described with reference to FIG. 3), the screw 3 inserted in the through hole made in the rim 11, the body 6 fixed to the rim 11 by means of the screw 3 and the sealing ring 10 placed between the rim 11 and the body 6.

The through hole made in the rim 11 and its seat 4 adapted to receive the head 5 of the screw 3 are not visible in FIG. 2 because they are occupied by the screw 3.

FIG. 3 shows diagrammatically a front view of the securing device 1 exploded; visible in FIG. 3 are the screw 3, the sealing ring 10, the body 6 and the stud 2 with a rounded head 9.

The stud 2 advantageously has a protruding, shaped collar 13 which allows a spoke to be tensioned by screwing the threaded shank of the stud 2 (by means of a tool acting on the collar 13) into a threaded seat situated at the end of the spoke, omitted in the appended figures for the sake of simplicity of the graphic representation.

Without departing from the scope of the invention, the collar 13 can be omitted if the spoke is made integral (in a per se known manner) with the stud 2 and tensioned by means (per se known) situated along the spoke and/or near the hub of the wheel.

The stud 2 is advantageously connected in an articulated manner to the body 6 by inserting the rounded head 9 of the stud 2 into the seat 8 (FIG. 6) present inside the body 6 and by bending the edges 12 of the body 6 in a per se known manner (for example by means of a press) in order to block the rounded head 9 of the stud 2 inside the seat 8.

FIG. 4 shows diagrammatically a front view of the securing device 1 assembled; visible in FIG. 4 are the body 6, the stud 2 inserted in one end of the body 6 and the screw 3 inserted in the opposite end of the body 6.

FIG. 5 shows diagrammatically the securing device of FIG. 4 wherein the stud 2, connected in an articulated manner to the body 6 of the securing device 1, is rotated with respect to the body 6; said articulated connection allows all the through holes for securing of the bodies 6 to be made perpendicular to the rim 11 and each spoke of the wheel to be given the required inclination.

FIG. 6 shows diagrammatically, in section, the body 6 of the securing device 1; visible in FIG. 6 are the threaded hole 7 adapted to receive the threaded shank of the screw 3, the seat 8 adapted to receive the rounded head 9 of the stud 2, the edges 12 of the body 6 bent to block the rounded head 9 of the stud 2 in the seat 8, the exit opening 14 and an annular seat 15 adapted to receive the sealing ring 10.

From FIG. 6 it can be seen that the seat 8 is substantially hemispherical in shape (and, in any case, of a shape complementary to that of the head 9 of the stud 2) and that the exit opening 14 is countersunk to allow the stud 2 to be connected in an articulated manner to the body 6.

FIG. 7 shows diagrammatically the securing device 1 of FIG. 4 sectioned along the plane A-A of FIG. 4; visible in FIG. 7 are the stud 2 having the rounded head 9 and the collar 13, the body 6, the screw 3 inserted in the threaded hole 7 of the body 6, the seat 8 wherein the rounded head 9 of the stud 2 is inserted, the countersunk exit opening 14 of the seat 8 and the sealing ring 10 placed in the seat 15, which cannot be seen in the figure because it is occupied by the sealing ring 10.

The securing device 1 made according to the invention presents numerous advantages with respect to the securing devices of the prior art, among which:

it allows tubeless or run-flat tyres to be used since the heads 5 of the screws 3 do not protrude on the inside of the rim 11 and the sealing rings 10 prevent air leaks through the through-holes present in the rim 11;

it is not necessary to increase the thickness of the rim 11 or to make bossed holes and/or to perform other machining on the rim in order to accommodate the heads 5 of the screws 3;

it can advantageously be used with lightened rims 11;

the articulated connection between the body 6 and the stud 2 allows the body 6 to be secured to the rim 11 parallel to the plane of said rim and to give the spoke of the spoked wheel the required inclination on a case-by-case basis;

if tubeless or run-flat tyres are used, there are no air leaks in the event of breakage of a stud 2.

Without departing from the scope of the invention, a person skilled in the art can make to the securing device previously described those changes or improvements which are suggested by normal experience and/or by the natural evolution of the art.

The invention claimed is:

1. A device (1) for securing a spoke to a rim (11) of a spoked wheel, comprising:

a screw (3), adapted to be inserted in a through hole made in the rim (11);

a body (6) extending from a first end to an opposite second end, the first end adapted to be secured to the rim (11), the first end of the body having an end surface configured to bear against an inner-facing surface of the rim when the body is secured to the rim (11) by means of the screw (3), the end surface surrounding a threaded hole (7) extending from the first end into the body in a direction perpendicular to a plane of the end surface, the threaded hole adapted to receive a threaded shank of the screw (3), an interior of the body forming a cavity adjacent to an end of the threaded hole (7), the cavity also in communication with an exit opening at the second end of the body, the cavity delimited by interior side walls of the body that become increasingly narrow along a direction toward the exit opening to form a seat (8) adapted to receive a rounded head (9) of a stud (2) connected to the spoke, the exit opening (14) comprising a passage extending from the seat (8) to the second end of the body (6); and a sealing ring (10) adapted to be inserted between the rim (11) and the body (6), wherein the end surface is comprised of a first annular surface surrounding the threaded hole and a second annular surface surrounding the threaded hole, the first annular surface having a width smaller than that of the second annular surface, the first and second annular surfaces separated by an annular ring seat (15) cut into the end surface between the first and second annular surfaces, and wherein the sealing ring (10) is housed in the ring seat (15) of the end surface.

2. The device (1) as in claim 1, wherein the seat (8) of the body (6) and the exit opening (14) of the body (6) are configured such that the stud (2), when inserted through the exit opening (14) and into the seat (8) of the body (6), is connected to the body (6) in an articulatable manner with respect to the body (6).

3. The device (1) as in claim 1, wherein the end surface of the body (6) is planar.

4. The device (1) as in claim 1, wherein the head (5) of the screw (3) has a countersunk shape configured to correspond to the seat (4) of the rim (11).

5. The device (1) as in claim 1, wherein the sealing ring (10) is an O-ring.

6. The device (1) as in claim 1, wherein the seat (8) of the body (6) has a spherical shape.

7. The device (1) as in claim 1, wherein the body (6) is configured to receive the rounded head (9) of the stud (2) into the seat (8) of the body (6), edges (12) of the body (6) being bendable to contain the rounded head (9) of the stud (2) inside the seat (8) of the body (6) after the rounded head (9) has been received.

8. The device (1) as in claim 1, wherein a width of the passage of the exit opening (14) increases as the passage extends from the seat (8) of the body (6) to the second end of the body (6).

9. The device (1) as in claim 8, wherein the passage of the exit opening (14) is conical in cross-section.

10. A device (1) for securing a spoke to a rim (11) of a spoked wheel, comprising:
   a body (6) extending longitudinally from a first end to an opposite second end, the first end of the body comprising an end surface extending transverse to a longitudinal length of the body, the end surface configured to bear against an inner surface of the rim (11) of the spoked wheel,
   the body (6) having a threaded hole (7) extending from the first end into an interior of the body and configured to receive a threaded shank of a screw (3), the end surface extending radially from an edge of the threaded hole,
   the body also having a cavity enclosed within a mid-section of the body (6), and an exit opening (14) at the second end of the body, the exit opening (14) forming a passage from the second end of the body (6) to a bottom end of the cavity where the passage joins with the cavity, and
   the cavity having a width that becomes increasingly narrow toward the bottom end of the cavity to form a constriction where the passage joins with the cavity, the constriction forming a seat (8) having a shape corresponding to a rounded head (9) at an end of the spoke,
   wherein the end surface comprises a first annular surface surrounding the threaded hole and extending radially from an edge of the threaded hole, a second annular surface surrounding the threaded hole and extending radially to an outermost edge of the first end of the body, and an annular groove (15) cut into the end surface of the first end between the first and the second annular surfaces.

11. The device (1) as in claim 10, wherein a width of the passage of the exit opening (14) increases from the constriction at the bottom end of the cavity where the passage joins with the cavity to a mouth of the exit opening (14) at the second end of the body (6) such that a spoke inserted through the exit opening (14) with the rounded head (9) contained by the seat (8) is articulatable with respect to the body (6).

12. The device (1) as in claim 11, wherein the passage of the exit opening (14) is conical in cross-section.

13. The device (1) as in claim 10, wherein edges (12) at the second end of the body are bendable to narrow the constriction where the passage joins with the cavity.

14. The device (1) as in claim 10, further comprising:
   a sealing ring (10) configured to be set within the annular groove (15), said sealing ring configured to provide a seal between the first end of the body (6) and the rim (11) of the spoked wheel.

15. The device (1) as in claim 10, wherein the body further comprises a side wall extending from an outer-edge of the first end of the body, perpendicularly to a plane of the end surface, to at least a mid-point along the longitudinal length of the body.

16. A wheel and device for securing a spoke to the wheel, comprising:
   a wheel rim having an inner surface and an opposite facing outer surface, the wheel rim having a through hole passing through the outer surface to the inner surface, the through hole at the outer surface including a seat wherein a width of the through hole increases in a direction from the inner surface to the outer surface;
   a screw having a threaded shank configured to pass through the through hole and a countersunk head configured to cooperate with the seat of the through hole; and
   a body comprising a first end and an opposite second end, the first end of the body comprising an end surface extending transverse to a longitudinal length of the body, and having a threaded hole extending from the first end into an interior of the body, the end surface extending radially from an edge of the threaded hole,
   an interior of the body forming a cavity adjacent to an end of the threaded hole, the cavity in communication with an exit opening at the second end of the body, the cavity delimited by interior side walls of the body that become increasingly narrow along a direction toward the exit opening to form a seat adapted to receive a rounded head of a stud connected to the spoke, the exit opening comprising a passage extending from the seat to the second end of the body,
   wherein the end surface of the body bears against the inner surface of the wheel rim and secured thereto by the screw, the countersunk head of the screw seated in the seat of the outer surface of the rim and the shank of the screw extending through the through hole and fastened to the body via threaded engagement with the threaded hole,
   wherein the end surface comprises a first annular surface surrounding the threaded hole and extending radially from the edge of the threaded hole, a second annular surface surrounding the threaded hole and extending radially to an outermost edge of the first end of the body, and an annular groove cut into the end surface of the first end between the first and the second annular surfaces.

17. The wheel and device as in claim 16, further comprising:
   a sealing ring set within the annular groove, said sealing ring configured to provide a seal between the inner surface of the wheel rim and the end surface of the body.

* * * * *